United States Patent [19]

Coleman

[11] 4,220,338
[45] Sep. 2, 1980

[54] VIDEO DISC PLAYER HAVING MODULAR CONSTRUCTION

[75] Inventor: Clyde F. Coleman, Crawfordsville, Ind.

[73] Assignee: RCA Corporation, New York, N.Y.

[21] Appl. No.: 964,533

[22] Filed: Nov. 29, 1978

[30] Foreign Application Priority Data

Feb. 13, 1978 [GB] United Kingdom ............... 05731/78

[51] Int. Cl.³ ............................................. G11B 1/00
[52] U.S. Cl. ...................................................... 274/2
[58] Field of Search .................. 274/2, 1 R, 9 R, 9 B; 360/86, 97; 358/128; 312/8

[56] References Cited

U.S. PATENT DOCUMENTS

| 2,318,183 | 5/1943 | Roberts | 274/9 R |
|---|---|---|---|
| 3,223,422 | 12/1965 | Ernst | 274/9 R |
| 3,336,031 | 8/1967 | Ammon et al. | 274/2 |
| 3,363,906 | 1/1968 | Miner et al. | 274/9 R |
| 3,666,274 | 5/1972 | Fox et al. | 274/9 B |
| 4,109,919 | 8/1978 | Elliott et al. | 274/9 B |
| 4,124,866 | 11/1978 | Coleman | 274/9 B |

*Primary Examiner*—John W. Shepperd
*Attorney, Agent, or Firm*—E. M. Whitacre; J. S. Tripoli; D. A. Kulkarni

[57] ABSTRACT

A player, such as a video disc player, comprises a decorative cover member having a top wall, a separable trough member having perimetrical side walls and a separable base member having a bottom wall. The trough member provides mountings for a turntable, a turntable drive mechanism, a signal pickup, a pickup carriage, a carriage translating mechanism and operating controls. The base member provides mountings for signal processing circuits disposed on a printed circuit board and for external connection to the player. The decorative cover member, the trough member and the base member are subject to assembly in which the top wall of the cover member, the perimetrical side walls of the trough member and the bottom wall of the base member, respectively, form the top wall, the side walls and the bottom wall of the player assembly. A flexible cable connects the trough member with the base member. The decorative cover member has openings for respectively providing access to the turntable, to the signal pickup and to the operating controls, when the assembly of the members is formed.

7 Claims, 6 Drawing Figures

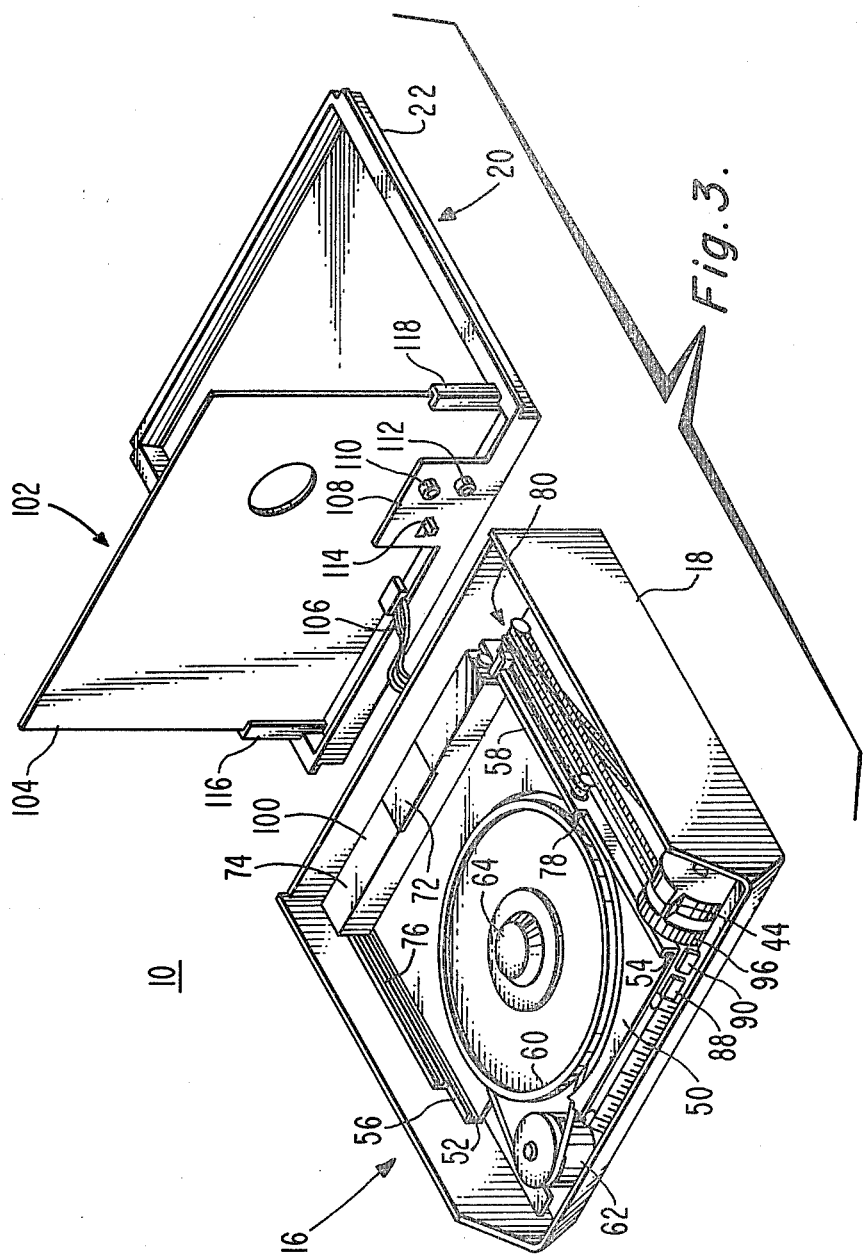

VIDEO DISC PLAYER HAVING MODULAR CONSTRUCTION

This invention generally relates to video disc players, and more particularly to modular construction of video disc players.

In certain video disc systems, information is stored on a disc record in the form of geometric variations in the bottom of a continuous spiral groove disposed on the record surface. Such systems typically include a turntable for centering and rotatably supporting a record for playback. The variations in capacitance between an electrode incorporated in a groove-riding stylus and a conductive coating disposed on the record surface are sensed during playback to reproduce the stored information. A capacitance-type video disc system is illustratively described in U.S. Pat. No. 3,842,194 (Clemens).

In such systems, it is advantageous to mount a groove-riding pickup stylus in a demountable cartridge. The player includes a carriage having a compartment for receiving the demountable cartridge. The carriage is driven during playback along carriage guiding rails in correlation with the motion of the groove-riding stylus. U.S. Pat. No. 3,870,320 (Torrington), discloses a type of carriage translating system.

It is beneficial to enclose a record in a thin plastic caddy. For record loading, an occupied caddy is inserted into an input slot provided in the player. The player is equipped with another set of rails for guiding caddy insertion along a path. A record extracting mechanism disposed in the player removes the record from the caddy during subsequent caddy withdrawal, whereby the record is retained in the player. The player is equipped with a platform for supporting the retained record when it is disposed in an elevated position. The retained record is transferred to the turntable for playback during motion of the platform to a depressed position. For subsequent record retrieval, the platform with the retained record resting thereon is raised, and an empty caddy is inserted into the player, thereby returning the record back into the caddy. Withdrawal of the caddy, effects record retrieval from the player. U.S. Pat. No. 4,098,511 (Leedom), and patent applications, Ser. Nos. 747,729 (Coleman), now U.S. Pat. No. 4,124,866 and Ser. No. 801,604 (Torrington), now U.S. Pat. No. 4,133,540, illustratively describe player systems suitable for use with a record caddy. The above patent and applications are assigned of record to the assignee of the instant application.

In a concurrently filed, copending application, Ser. No. 964,531, Torrington, entitled "VIDEO DISC PLAYER", a novel video disc player design is described. In the therein disclosed design, the carriage is translated along a path disposed substantially parallel to the path of caddy insertion. Pursuant to a further feature of the Torrington invention, the direction of translation of the carriage during playback is opposite to the direction of the caddy insertion. The location of the caddy path relative to the carriage path is such that the caddy engages the carriage when the carriage is at a position other than at a starting position during a caddy insertion, whereby the carriage is restored to the starting position. The Torrington application is assigned of record to the assignee of the instant application.

In such systems, it is desirable that the player has a modular construction, which provides greater flexibility and is advantageous from the player assembly, testing and after-sales-service standpoint. The player, in accordance with the instant invention, comprises a decorative cover member having a top wall, a separable trough member having perimetrical side walls and a separable base member having a bottom wall. The trough member typically houses the turntable, the turntable drive mechanism, the signal pickup, the pickup carriage, the carriage translating mechanism and the operating controls. The base member typically provides mountings for signal processing circuits and external connections for the player. The members are subject to assembly such that the top wall of the cover member, the perimetrical side walls of the trough member, and the bottom wall of the base member, respectively, define the top wall, the side walls and the bottom wall of the player assembly. A flexible cord connects the trough member with the base member, and is sufficiently long to allow player operation while the assembly is separated. The decorative cover member is provided with openings for respectively permitting access to the turntable, to the signal pickup and to the operating controls when the assembly of the member is formed.

IN THE DRAWINGS

FIG. 3 shows a side-by-side operation of the mechanical subsection and the electronics subsection of the player of FIGS. 1 and 2;

Figure 1:
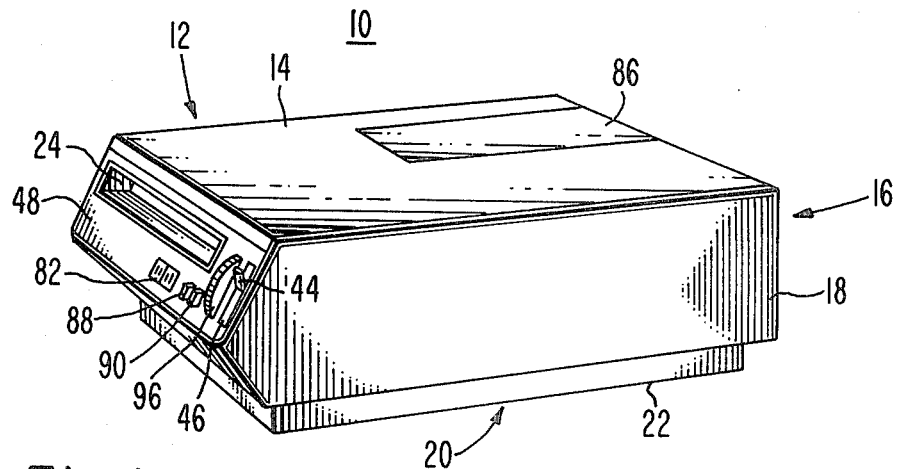
FIG. 1 illustrates a video disc player having a modular construction in accordance with the principles of the instant invention.
Figure 2:
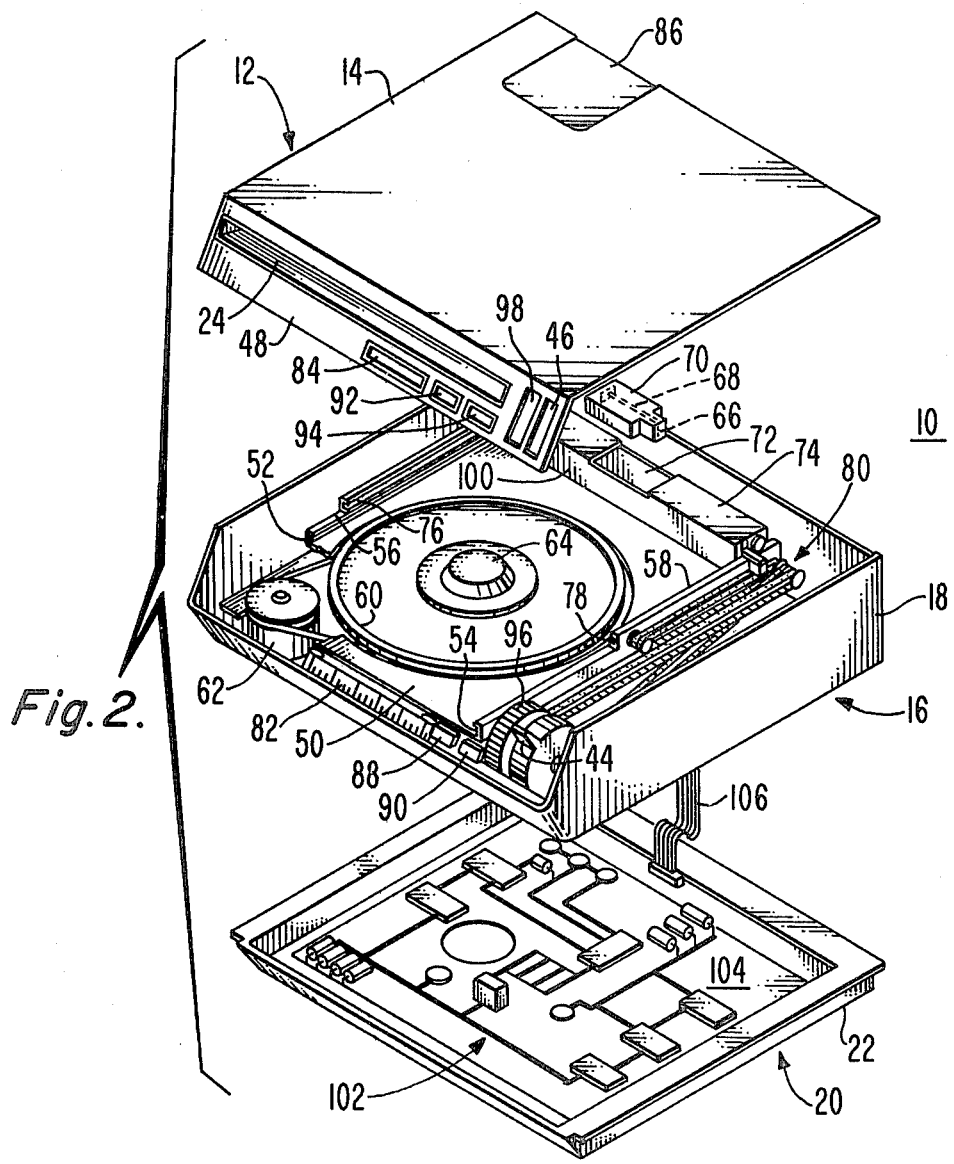
FIG. 2 shows an exploded perspective view of the player of FIG. 1.

Shown in FIGS. 1-3 is a video disc player assembly 10 having a modular construction in accordance with the present invention. The player comprises a decorative cover member 12 having a top wall 14, a trough member 16 having perimetrical side walls 18 and a base member 20 having a bottom wall 22. The player has an input slot 24, disposed in the cover member, through which a record carrying caddy 25 is inserted for loading an enclosed record into the player.

Figure 4:
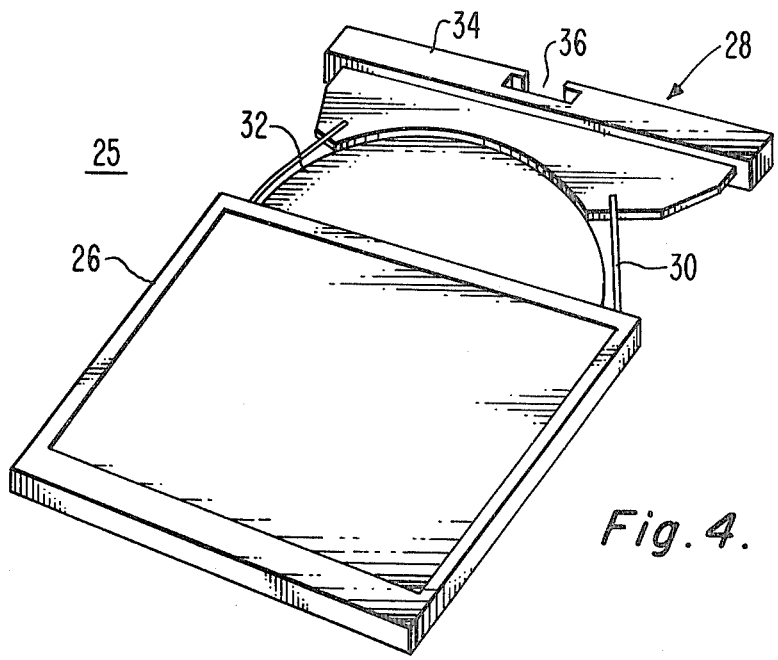
FIG. 4 shows a record bearing caddy suitable for use with the player of FIG. 1.
Figure 5:
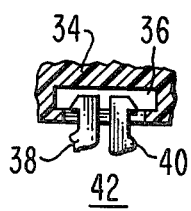
FIGS. 5 and 6 depict the operation of a record extracting mechanism mounted in the player of FIG. 1.
Figure 6:
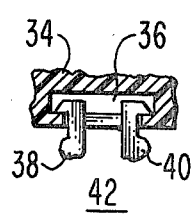

As shown in FIG. 4, the record caddy 25 comprises an outer jacket 26 and a record retaining member 28 removably located within the jacket. The retaining member comprises (1) an annular ring 30, that encircles an enclosed record 32, and (2) a spine 34, which serves as a closure to keep dust and debris from entering the record enclosing cavity. The spine has an opening 36 into which the latch arms 38 and 40 of a record extracting mechanism 42 (FIGS. 5 and 6) protrude during arrival of a record caddy at a fully inserted position in the player.

A function selection lever 44 projects through a slot 46 disposed in the front instrumental panel 48 of the cover member, and is subject to selective positioning in one of the three locations thereof: OFF, DISC IN/OUT and PLAY.

A platform 50, movably mounted within the trough member 16 and responsive to the position of the function selection lever 44, is subject to motion between an elevated position and a depressed position. The DISC IN/OUT position and the PLAY position of the function selection lever, respectively, correspond to the elevated position and the depressed position of the platform. A pair of grooves 52 and 54 are provided in rails 56 and 58 mounted on the platform for guiding insertion of a caddy into the player assembly along a path. The front ends of the caddy guiding grooves are aligned with the input slot 24 when the platform is occupying the elevated position for facilitating caddy insertion and extraction.

To load a record into the player, the latch arms 38 and 40 are disposed in the closed condition (FIG. 5), the function selection lever is shifted to the DISC IN/OUT position to dispose the platform 50 in the elevated position, and an occupied caddy is inserted through the input slot 24. The latch arms 38 and 40 enter the opening 36 in the spine 34 as the caddy reaches the fully inserted position in the player. The engagement of the caddy with an actuating arm indexes the latch arms into the spread apart condition (FIG. 6), whereby the retaining member and the associated record (i.e., the record assembly) are locked to the platform. Subsequent withdrawal of the caddy removes the record assembly therefrom, thereby retaining the record assembly in the player resting on the raised platform. To transfer the retained record to a turntable 60 rotatably mounted within the trough member, the platform is lowered to the depressed position.

For record retrieval, the above sequence is reversed. The platform 50, with the record assembly resting thereon, is raised. The platform is provided with a set of depressible lifting pads (not shown) to align the record assembly resting thereon with the caddy guiding grooves to cause the return of the record assembly into an empty caddy during insertion thereof into the player. The engagement of the caddy with the actuating arm reindexes the latch arms to the closed condition, thereby freeing the record assembly from the player. Subsequent caddy withdrawal removes the enclosed record assembly therewith.

The turntable 60 is driven by a motor 62, as shown in FIG. 2, to rotate at a predetermined speed within preset limits (e.g., 450 rpm ±0.01%). U.S. Pat. No. 3,912,283 (Hammond, et al.), describes an illustrative turntable drive arrangement. The turntable is provided with a spindle 64 for centering a record disposed thereon.

A groove-riding pickup stylus 66 is disposed at the free end of a stylus arm 68. The stylus arm is, in turn, pivotally mounted within a demountable pickup cartridge 70. The cartridge is received in a compartment 72 provided in a carriage 74. The platform rails 56 and 58 are additionally provided with grooves 76 and 78 for guiding the carriage along a second path lying parallel to the caddy insertion path. A carriage translating mechanism 80 is provided in the trough member for translating the carriage during playback toward the turntable spindle at a speed correlated to the speed of rotation of the turntable to recover the recorded information from a turntable-supported record. A dial 82, responsive to the position of the carriage along the carriage path, is disposed in the trough member for indicating playing time. The cover member 12 has a readout window 84 for permitting viewing of the dial by the user of the player. A flap 86 is disposed on the cover member for providing access to the demountable pickup cartridge 70.

The player includes a pause button 88 and a search button 90, which protrude, respectively, through apertures 92 and 94 in the cover member. Actuation of the pause button lifts the pickup stylus away from a turntable-supported record, and halts carriage translation to suspend playback operation. Normal playback is resumed by releasing the pause button.

For active searching of a turntable-supported record, the search button 90 is depressed, and the carriage 74 is translated by means of a manually-operated thumbwheel 96 while the pickup stylus remains in engagement with the turntable-supported record. The carriage is translatable at a speed variable over a range of speeds and in either direction by the thumbwheel. The thumbwheel drive arrangement is also usable for providing special effects (such as repeat play, fast forward and reverse motion). The cover member 12 has a cutout 98 through which access is provided to the thumbwheel. Normal playback is resumed when the search button is released.

Pickup circuits 100, connected to the output of the stylus 66, are mounted in the carriage 74 for developing at the output thereof a signal representative of the prerecorded signals disposed on a turntable-supported record. Signal processing circuits 102, located on a printed circuit board 104 and coupled to the output of the pickup circuits, are mounted in the base member 20 for developing at the output thereof a signal suitable for application to a conventional television receiver. The pickup circuits are illustratively of the type described in U.S. Pat. No. 4,080,625 (Kawamoto, et al.). U.S. Pat. No. 4,097,899 (Yu), describes typical signal processing circuits. A flexible cable 106 is provided for connecting the trough member 16 to the base member. As shown in FIG. 3, the flexible cable is sufficiently long to allow player operation when the trough member (housing the various player mechanisms) is placed side-by-side with the base member (which houses the player electronics). A connector bracket 108, secured to the base member, is provided with an antenna input socket 110, a player output terminal 112 and a channel selector switch 114. A pair of spaced holders 116 and 118, alternately, support the printed circuit board 104 in an operating position (FIG. 2) and in a servicing position (FIG. 3) permitting access to both sides of the printed circuit board.

The decorative cover member 12, the trough member 16 and the base member 20 are subject to assembly, as shown in FIG. 1, such that the top wall 14 of the cover member, the perimetrical side walls 18 of the trough member and the bottom wall 22 of the base member, respectively, define the top wall, the side walls and the bottom wall of the player assembly 10.

The three members are molded from structural foam material, which comprises cellular structure sandwiched between smooth exterior surfaces. A suitable foaming agent (e.g., "EXPANDEX THT" made by National Polychem, Inc.) is added to thermoplastic material (e.g., polystyrene) to achieve the cellular structure construction. Among the advantages of the structural-foamed-molded construction are: greater strength-to-weight ratio, stress-free and sink-free moldings, elimination of machining, integrally molded fastening and locating elements, etc.

The modular construction of the player, in accordance with the instant invention, provides greater flexibility, and several advantages from the player assembly, testing and after-sales-service points of view. The three subassemblies, for example, could be manufactured in factories which are geographically separated and shipped to the plant where final assembly is performed. The decorative cover is assembled last to minimize damage to the ornamental features of the player. The modular construction also facilitates separate inspection and testing of the mechanical subassembly and electronics subassembly.

Filed concurrently herewith are the following U.S. patent applications: (1) application, Ser. No. 964,531, of L. A. Torrington, entitled "VIDEO DISC PLAYER", (2) application, Ser. No. 964,537, of L. A. Torrington and J. A. Allen, entitled "VIDEO DISC PLAYER HAVING UNITARY RECORD HANDLING PLATFORM CONSTRUCTION", (3) application, Ser. No. 964,586, of J. A. Allen, entitled "CARRIAGE TRANSLATING APPARATUS FOR VIDEO DISC PLAYER", (4) application, Ser. No. 864,534 of F. R. Stave, entitled "VIDEO DISC PLAYER HAVING MANUAL SCANNING FACILITY", (5) application, Ser. No. 964,535, of F. R. Stave, entitled "APPARATUS FOR FACILITATING CARRIAGE RETURN IN VIDEO DISC PLAYER", (6) application, Ser. No. 964,532, of F. R. Stave, entitled "VIDEO DISC PLAYER HAVING RECORD SIDE IDENTIFICATION APPARATUS", (7) application, Ser. No. 964,530 of L. A. Torrington, entitled "MANUAL SCANNING MECHANISM FOR VIDEO DISC PLAYER", (8) application, Ser. No. 964,529, of L. D. Huff, entitled "TOGGLE MECHANISM FOR VIDEO DISC PLAYER", (9) application, Ser. No. 964,528, of L. A. Torrington, entitled "RECORD SIDE IDENTIFICATION APPARATUS FOR VIDEO DISC PLAYER", (10) application, Ser. No. 964,527, of L. A. Torrington and L. D. Huff, entitled "CONSTANT DRAG CARRIAGE TRANSLATING MECHANISM FOR VIDEO DISC PLAYER", (11) application, Ser. No. 964,526, of L. A. Torrington and L. D. Huff, entitled "MECHANISM FOR AIDING CARRIAGE RETURN IN VIDEO DISC PLAYER", (12) application, Ser. No. 964,633 of L. A. Torrington, entitled "VIDEO DISC PLAYER HAVING ADJUSTABLE END-OF-PLAY SWITCH", and (13) application, Ser. No. 964,643, of C. F. Coleman and N. L. Farley, entitled "CADDY-ACTUATED DECLUTCHING MECHANISM FOR VIDEO DISC PLAYER". Reference may be made to these applications for explanation of video disc player features that may advantageously be employed with the present invention.

What is claimed is:

1. In a player for use with a disc record subject to removable occupancy of a protective caddy; said player including means for extracting said record from said caddy when said caddy is withdrawn from said player after a full insertion of an occupied caddy into said player along a path, whereby said extracted record is retained in said player for playback; a turntable for centering and supporting said retained record; means for rotating said turntable; a signal pickup for recovering prerecorded signals from said retained record during playback; a carriage for supporting said signal pickup; means for translating said carriage along a further path disposed substantially parallel to said caddy insertion path and at a speed correlated to the speed of rotation of said turntable during playback; pickup circuits disposed in said carriage and coupled to the output of said signal pickup for developing at the output thereof a signal representative of said prerecorded signals on said record; signal processing circuits coupled to said output of said pickup circuits for developing a signal suitable for application to a television receiver; and controls for operating said player; apparatus including:

(A) a separable cover member having a top wall;
(B) a separable trough member having perimetrical side walls; said trough member including means for rotatably supporting said turntable; wherein means are provided for mounting said turntable rotating means to said trough member; said trough member having means for guiding said carriage along said further path; wherein means are provided for securing said carriage translating means to said trough member; said trough member being equipped with means for mounting said operating controls; and
(C) a separable base member having a bottom wall; said base member including means for securing said signal processing circuits thereto;

wherein said cover member, said trough member and said base member are subject to assembly in which said top wall of said cover member, said perimetrical side walls of said trough member and said bottom wall of said base member, respectively, for the top wall, the side walls and the bottom wall of the player assembly; wherein said cover member has openings for respectively providing access to said signal pickup and to said operating controls, and has an input slot arranged in said caddy insertion path for permitting insertion of said caddy into said player, when said assembly of said members is formed.

2. An apparatus in accordance with claim 1 for use with said player which further includes a platform (a) for supporting a record loaded in said player assembly while occupying an elevated position, and (b) for effecting transfer of said loaded record to said turntable during motion thereof to a depressed position; said trough member including means for movably mounting said platform; said carriage guiding means being mounted on said platform.

3. An apparatus in accordance with claim 2 wherein said input slot is located such that said slot is aligned with said platform disposed in said elevated position when said assembly of said members is formed.

4. An apparatus in accordance with claim 1 for use with said player which includes means for indicating radial position of said carriage relative to said turntable; said trough member having means for securing said carriage position indicating means thereto; said cover member including an additional opening for permitting viewing of said carriage position indicating means when said assembly of said members is formed.

5. An apparatus in accordance with claim 1 wherein said base member is provided with a terminal and means for coupling the output of said signal processing circuits to said terminal.

6. An apparatus in accordance with claim 1 wherein said coupling between said pickup circuits and said signal processing circuits comprises a flexible cable of sufficient length to permit separation, and side-by-side placement of said trough member and said base member.

7. An apparatus in accordance with claim 1 wherein said signal processing circuits comprise a printed circuit board; said means for securing said signal processing circuits to said base member includes means for supporting said printed circuit board alternately (a) in an operating position, and (b) in a service position permitting access to said printed circuit board during servicing.

* * * * *